US 6,487,415 B1

(12) United States Patent
Eibling et al.

(10) Patent No.: US 6,487,415 B1
(45) Date of Patent: Nov. 26, 2002

(54) METHOD FOR INITIATING CALL BLOCKING BASED UPON PILOT FRACTION

(75) Inventors: Edward Ellis Eibling, Convent Station, NJ (US); Asif Dawoodi Ganhi, Summit, NJ (US); Wen-Yi Kuo, Morganville, NJ (US); Mathew Thomas, Scotch Plains, NJ (US); Carl Francis Weaver, Hanover Township, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/356,816

(22) Filed: Jul. 19, 1999

(51) Int. Cl.$^7$ ............................................... H04B 7/216
(52) U.S. Cl. ........................................ 455/453; 455/445
(58) Field of Search ................................. 455/453, 450, 455/522, 67.4, 67.1, 445

(56) References Cited

U.S. PATENT DOCUMENTS 5,530,920 A    6/1996  Takeda ........................ 455/102
5,577,022 A  * 11/1996  Padovani ..................... 370/13

(List continued on next page.)

FOREIGN PATENT DOCUMENTS

EP    0 750 440 A    12/1996  ............ H04Q/7/38
EP    0805568 A1    11/1997  ............ H04B/7/185
EP    0 889 663      1/1999  ............ H04Q/7/38

OTHER PUBLICATIONS

European Patent Office Search Report, Application No. EP 00 30 5850, Berlin, Oct. 18, 2001.

(List continued on next page.)

Primary Examiner—Daniel Hunter
Assistant Examiner—Nick Corsaro
(74) Attorney, Agent, or Firm—Irena Lager (57) ABSTRACT

A method that initiates call blocking responsive to a call-quality measurement of the forward link. The call-quality measurement is a measurement of how well a mobile terminal is able to receive the forward link. One call-quality measurement is a pilot fraction of the forward link, which is a ratio of the pilot's power level to the power level of a set of forward-link signals of a base station. Call blocking is initiated when an average pilot fraction is below a pilot-fraction blocking threshold. The pilot's power level is obtained for a time period, and the signal set's power level is obtained for the same time period. The pilot fraction is determined for the time period, and then used to determine the average pilot fraction for the time period. The average pilot fraction for the current time period is based on a pilot fraction for the current time period, and an average pilot fraction for a previous time period. When the average pilot fraction is below the pilot-fraction blocking threshold, call blocking is initiated. The pilot-fraction blocking threshold is preferably based on: 1) the pilot fraction when the base station is at full load; 2) the size, shape, and terrain of the cell; and 3) the aggressiveness of the overload control. In the preferred embodiment, the signal set includes all of the signals generated by the base station, alternatively, the signal set can include fewer than all the signals generated by the base station. If the cell includes several sectors, the call blocking is initiated on a sector basis when the average pilot fraction of the sector is below the pilot-fraction blocking threshold. Other call-quality measurements, such as the forward link's frame error rate, the number of dropped calls, or the Power Measurement Report Message (PMRM), can be used, alone or in combination, instead of or in addition to the pilot fraction of the forward link to determine whether call blocking should be initiated. Determining whether call blocking should be initiated using one of the other call-quality measurements is performed in a similar manner as for the pilot fraction. Initiating call blocking using several call-quality measurements involves initiating call blocking when any one of the call-quality measurements indicates that call blocking should be initiated. Alternatively, call blocking can be initiated when several of the call quality measurements indicate that call blocking should be initiated.

29 Claims, 4 Drawing Sheets

U.S. PATENT DOCUMENTS

| | | | |
|---|---|---|---|
| 5,666,356 A | | 9/1997 | Fleming .................... 370/328 |
| 5,708,681 A | | 1/1998 | Malkemes et al. .......... 375/297 |
| 5,825,835 A | | 10/1998 | Kingston et al. ........... 375/367 |
| 5,862,453 A | | 1/1999 | Love et al. .................. 455/69 |
| 5,903,554 A | * | 5/1999 | Saints ........................ 370/342 |
| 5,937,353 A | * | 8/1999 | Fapojuwo ................... 455/444 |
| 6,044,072 A | * | 3/2000 | Ueda .......................... 370/335 |
| 6,061,339 A | * | 5/2000 | Nieczyporowicz .......... 370/335 |
| 6,112,092 A | | 8/2000 | Beveniste ................... 455/450 |
| 6,223,041 B1 | * | 5/2001 | Egner ......................... 455/452 |
| 6,278,882 B1 | * | 8/2001 | Choi ........................... 455/453 |
| 6,304,624 B1 | * | 10/2001 | Seki ............................ 375/365 |

OTHER PUBLICATIONS

Patent No. 5,715,526, filed on Sep. 8, 1995 and issued on Feb. 3, 1998, to Lindsay A. Weaver, Jr. and Robert W. Boesel.

* cited by examiner

METHOD FOR INITIATING CALL BLOCKING BASED UPON PILOT FRACTION

CROSS-REFERENCE TO RELATED APPLICATION

Related subject matter is disclosed in the following application filed concurrently herewith and assigned to the same Assignee hereof: U.S. patent application "Aggregate Overload Power Control", Ser. No. 08/356.816.

BACKGROUND OF THE INVENTION

1. Field of the Invention

The present invention relates generally to wireless communication systems and, in particular, to call admission control in wireless communication systems.

2. Description of the Related Art

Wireless communication systems employ Code Division Multiple Access ("CDMA") modulation techniques to permit a large number of system users to communicate with one another. Such systems work because each signal is coded with spreading sequences, such as with pseudo-random noise ("PN") sequences, and orthogonal spreading sequences, such as Walsh codes. This coding permits signal separation and signal reconstruction at the receiver. In typical CDMA systems, communication is achieved by using a different spreading sequence for each channel. This permits a plurality of transmitted signals to share the same bandwidth. Particular transmitted signals are retrieved from the communication channel by despreading a signal from all of the signals. Despreading is achieved by using a known user despreading sequence related to the spreading sequence implemented at the transmitter.

Figure 1:
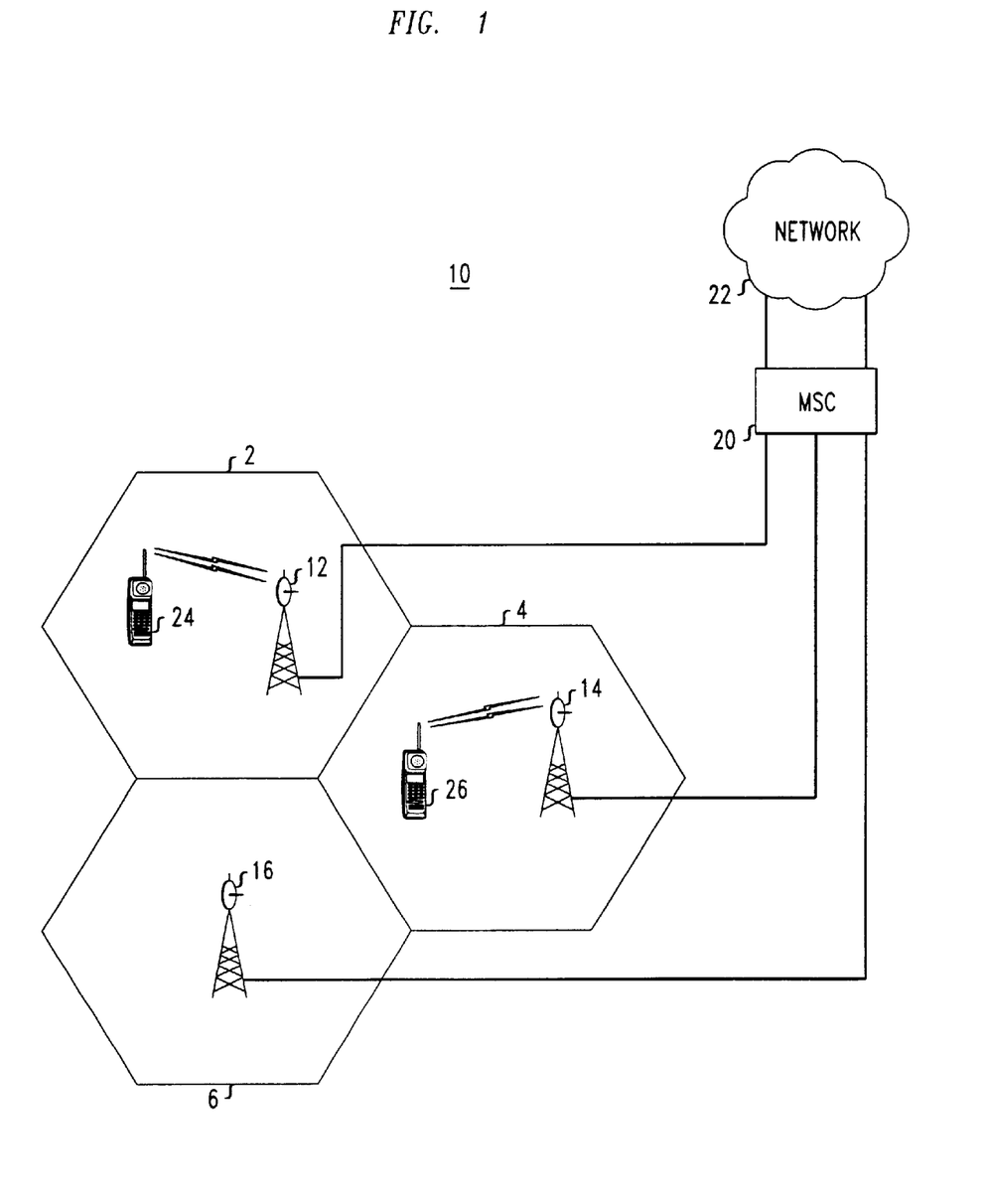
FIG. 1 is a block diagram of a portion of a wireless communication system.

FIG. 1 illustrates CDMA system 10. The geographic area serviced by CDMA system 10 is divided into a plurality of spatially distinct areas called "cells." Although cells 2, 4, 6 are illustrated as a hexagon in a honeycomb pattern, each cell is actually of an irregular shape that depends on the topography of the terrain surrounding the cell. Each cell 2, 4, 6 contains one base station 12, 14, and 16, respectively. Each base station 12, 14, and 16 includes equipment to communicate with Mobile Switching Center ("MSC") 20, which is connected to local and/or long-distance transmission network 22, such as a public switch telephone network (PSTN). Each base station 12, 14, and 16 also includes radios and antennas that the base station uses to communicate with mobile terminals 24, 26.

When a call is set up in a CDMA system, a base station and mobile terminal communicate over a forward link and a reverse link. The forward link includes communication channels for transmitting signals from the base station to the mobile terminal, and the reverse link includes communication channels for transmitting signals from the mobile terminal to the base station. The base station transmits certain types of control information to the mobile terminal over a communication channel, referred to herein as a forward control channel, also known in the art as a forward overhead channel. Forward control channels include the pilot, paging, and synchronization channels. The base station transmits voice or data, and certain types of control information over a communication channel, referred to herein as a forward traffic channel. The signals on the communication channels are organized in time periods, referred to herein as frames. (Frames are typically 20-millisecond (ms) in length. The signals transmitted over the control channels are referred to herein as control signals, and the signals transmitted over the traffic channels are referred to herein as traffic signals.

Some base stations may implement overload control to ensure that the power transmitted by the base station does not exceed the power level at which the base station's equipment is designed to operate over an extended time period. The base stations implement overload control by using one of several remedies. Typically, one of these remedies includes denying access to any new call requests, referred to herein as call blocking. Typically, call blocking is initiated when the total power level of all the signals transmitted by the base station reaches a certain percentage, for example, 80% to 100% of the maximum output power level at which the base station's amplifier is designed to operate over an extended time period. This maximum output power is referred to herein as the amplifier's maximum-continuous power level.

The inventors have discovered that problems can result from initiating call blocking based on only the total power level of the signals transmitted by the base station. Generally, when a call is added to a cell, the noise level in the cell and in the surrounding cells is increased. This makes it more difficult for a mobile terminal to clearly obtain the pilot, particularly if the mobile terminal is at the edge of a cell. In some base stations the pilot's power level can vary. In the case where the pilot's power level is reduced, it is even more difficult for a mobile terminal at the edge of a cell to obtain the pilot. When the mobile terminal cannot obtain a clear and continuous pilot, problems can result on the call between this mobile terminal and the base station. These problems can range from not being able to despread a frame, which results in an erred frame, to dropping a call, which results in an inconvenience to the customer and a loss of revenue. Therefore, although the total power level is still below the percentage at which calls are blocked, adding the call may cause calls already in the cell to have difficulties.

SUMMARY OF THE INVENTION

The invention solves the above problems by initiating call blocking responsive to a call-quality measurement of the forward link. A call-quality measurement is a measurement of how well a mobile terminal is able to receive the forward link.

One call-quality measurement is a pilot fraction of the forward link, which is a ratio of the pilot's power level to the power level of a set of forward-link signals of a base station. Preferably, call blocking is initiated when an average pilot fraction is below a pilot-fraction blocking threshold. Alternatively, call blocking can be initiated when the pilot fraction is below the pilot-fraction blocking threshold.

The pilot's power level is obtained for a time period, and the signal set's power level is obtained for the same time period. The pilot fraction is determined for the time period. The pilot fraction is then used to determine the average pilot fraction for the current time period. The average pilot fraction for the current time period is based on the pilot fraction for the current time period and an average pilot fraction for a previous time period. Alternatively, the average pilot fraction for the current time period can be based on the pilot fraction for the current time period, and the pilot fractions of the previous plurality of time periods, averaged over the plurality of time periods.

When the average pilot fraction is below the pilot-fraction blocking threshold, call blocking is initiated. The pilot-fraction blocking threshold is preferably based on several factors. The first is the pilot fraction when the base station is at full load. The second is the size, shape, and terrain of the cell. The third is the aggressiveness of the overload control, which is the balance between the desire to increase the capacity of the system and the desire to ensure the signal is received at a particular quality. In the preferred embodiment, the signal set includes all of the signals generated by the base station, alternatively, the signal set can include fewer than all the signals generated by the base station. For example, the signal set can include a plurality of traffic signals, or a plurality of traffic signals and one or more of the control signal.

If the cell includes several sectors, the call blocking is initiated on a sector basis. Call blocking is initiated when the average pilot fraction of the sector is below the pilot-fraction blocking threshold.

Other call-quality measurements, such as the forward link's frame error rate, the number of dropped calls, or the Power Measurement Report Message (PMRM), can be used, alone or in combination, instead of or in addition to the pilot fraction of the forward link to determine whether call blocking should be initiated. Determining whether call blocking should be initiated using one of the other call-quality measurements is performed in a similar manner as described above for the pilot fraction. Determining whether call blocking should be initiated using several call-quality measurements involves determining whether call blocking should be initiated based on any of the call quality measurements and initiating call blocking when any one of the call-quality measurements indicates that call blocking should be initiated. Alternatively, call blocking can be initiated when several of the call quality measurements indicate that call blocking should be initiated.

DETAILED DESCRIPTION

Figure 2:
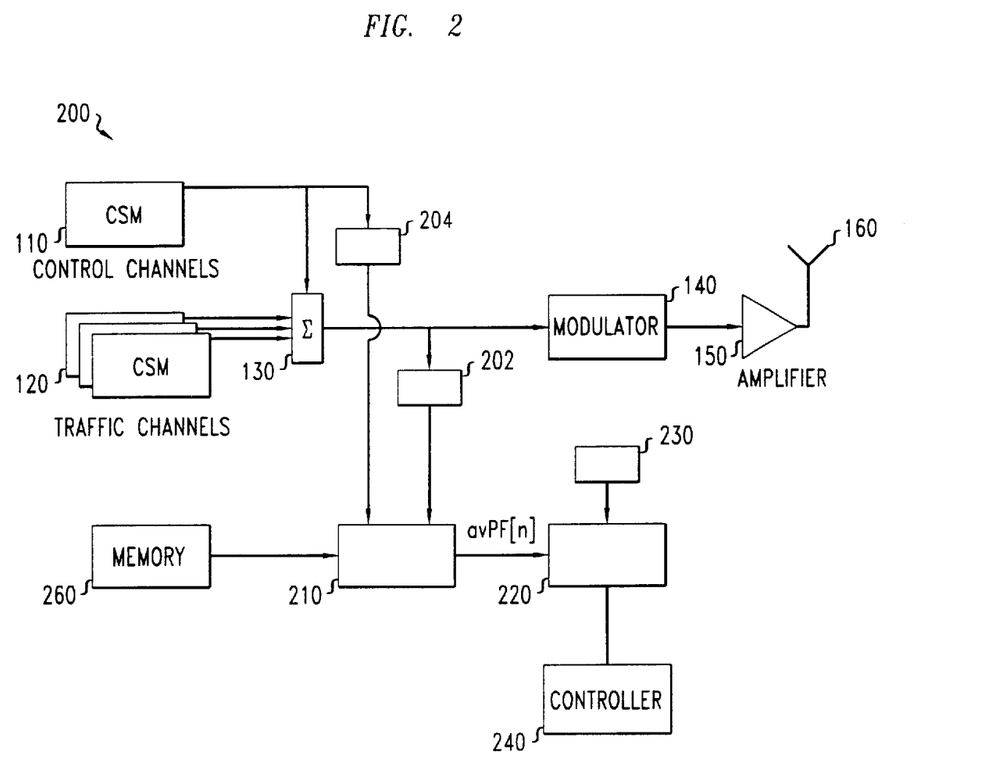
FIG. 2 is a block diagram of a portion of a base station where call blocking is initiated responsive to a pilot fraction being below a pilot-fraction blocking threshold.

FIG. 2 shows a portion of base station 200 that causes call blocking to be initiated responsive to a call-quality measurement of the forward link. A call-quality measurement is a measurement of how well a mobile terminal is able to receive the forward link. The call-quality measurement used in base station 200 is a pilot fraction of the forward link, which is a ratio of the pilot's power level to the power level of a set of forward-link signals of base station 200. Preferably, call blocking is initiated when an average pilot fraction is below a pilot-fraction blocking threshold. Alternatively, call blocking can be initiated when the pilot fraction is below the pilot-fraction blocking threshold.

Although, in the illustrative embodiment base station 200 uses the pilot fraction to determine whether call blocking should be initiated, other call-quality measurements can be used, alone or in combination, instead of or in addition to the pilot fraction of the forward link to determine whether call blocking should be initiated. This will be described in more detail below. For example, call-quality measurements such as the forward link's frame error rate, the number of dropped calls, the Power Measurement Report Message (PMRM), or the PMRM/erlang, can be used to determine whether call blocking should be initiated.

Each of the base station's signals is the output of one of channel elements 110, 120. The channel elements encode the data with the spreading codes. The control signals are the output of control-channel channel elements 110, and the traffic signals are the output of traffic-channel channel elements 120. The output of all of the channel elements 110 and 120 is coupled to combiner 130 where all of the signals are combined together to form the combined-baseband signal. The signals are organized in frames, which, as described above, are typically 20-millisecond (ms) time periods. The instantaneous power levels of the combined-baseband signal are measured throughout the current frame, and are then averaged in sample-square-integrate circuit 202. This averaged power level is referred to herein as the combined-baseband signal's power level for the current frame. The pilot's instantaneous power levels are also measured throughout the current frame, and are then averaged in sample-square-integrate circuit 204. This averaged power level is referred to herein as the pilot's power level for the current frame. The combined-baseband signal's power level and the pilot's power level for the current frame are the input of first averaging element 210.

First averaging element 210 obtains the current frame's ratio of the pilot's power level to the combined-baseband signal's power level, referred to herein as the current frame's pilot fraction PF[n]. First averaging element 210 then determines the average pilot fraction avPF[n] using a single pole infinite impulse response (IIR) filter. The functionality of the IIR filter is described in equation 1. As shown in equation 1, the value of the average pilot fraction avPF[n] is based on the current frame's pilot fraction PF[n] scaled by $\lambda$, and the previous frame's average pilot fraction avPF[n] scaled by an adjustment factor based on $\lambda$. $\lambda$ controls how rapidly the average pilot fraction avPF[n] changes in response to variations in the pilot fraction of the current frame PF[n]. $\lambda$ is selected to balance a desire to regain a particular level of call quality as quickly as possible and a desire to have a smoothly varying control function to avoid false triggering of call blocking. A typical value for $\lambda$ can be between about 2 and 200.

$$avPF[n] = \frac{1}{\lambda} * PF[n] + \left(1 - \frac{1}{\lambda}\right) * avPF[n-1] \quad (1)$$

Figure 3:
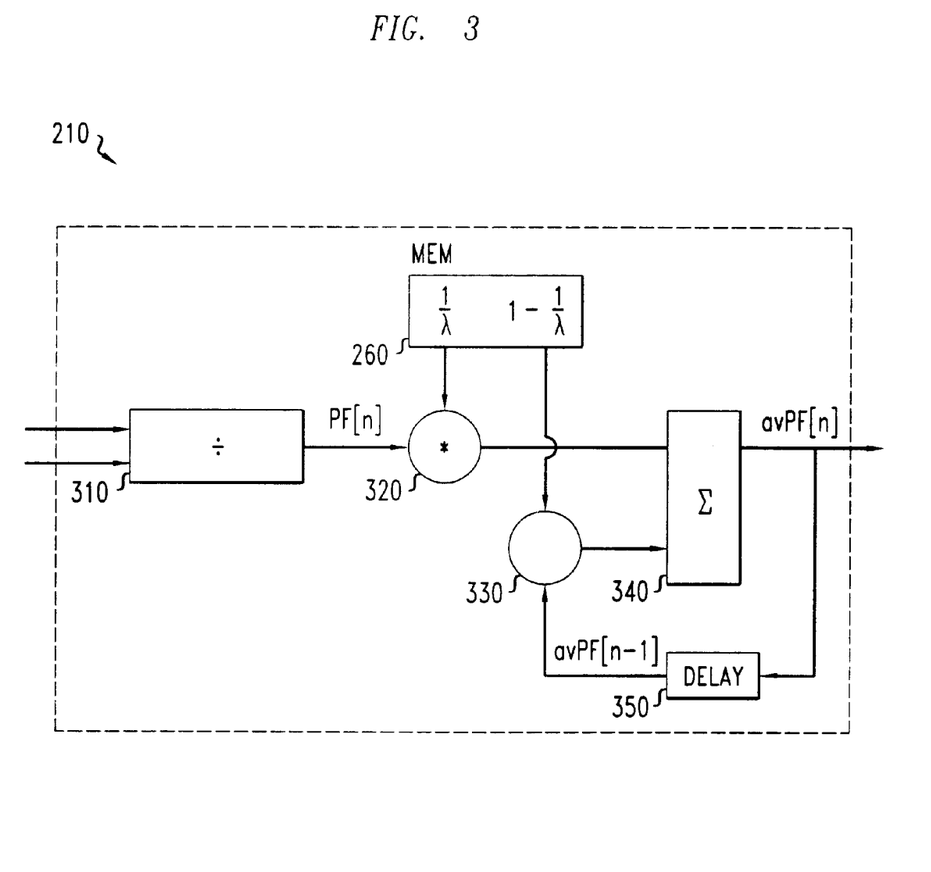
FIG. 3 is a block diagram of a first averaging element of the base station.

FIG. 3 shows first averaging element 210 in more detail. Divider 310 divides the pilot's power level for the current frame by the combined-baseband signal's power level to obtain the current frame's pilot fraction PF[n]. Multiplier 320 multiplies the current frame's pilot fraction PF[n] by $$\frac{1}{\lambda}.$$

Multiplier 330 multiplies the previous frame's average pilot fraction avPF[n−1] and $$1 - \frac{1}{\lambda},$$

which can be stored in memory 260. The result of multiplier 320 and multiplier 330 is added in combiner 340 to obtain the current frame's average pilot fraction avPF[n]. The current frame's average pilot fraction avPF[n] is an input of delay circuit 350, which is typically one or more flip-flops, where it is delayed by one frame to be used as an input of multiplier 330 for the next frame. Although the first averaging element 210 is shown as being implemented in hardware, it can be implemented in software.

First averaging element 210 provides the current frame's average pilot fraction avPF[n] to comparator 220. Comparator 220 compares the average pilot fraction avPF[n] with the pilot-fraction blocking threshold, which can be stored in memory 230. The pilot-fraction blocking threshold is preferably between 60% to 120% of the full load pilot fraction, although it can be any value between 0 and 150% of the full load pilot fraction. The pilot-fraction blocking threshold is based on several factors. The first factor is the full load pilot fraction. Typically, the full load pilot fraction is between 0.1 and 0.25. The second factor is the size, shape, and terrain of the cell. When the cell is small, the edges of the cell are about equidistant from the base station, and there are few obstructions in the cell that would reflect a signal from the base station to the mobile terminal, then a smaller pilot can still reach the mobile terminals in the cell. In this case, a pilot-fraction blocking threshold that is significantly less than the full load threshold ratio can be selected, for example, the pilot-fraction blocking threshold can be between 60% and 80% of the full load pilot fraction. When the cell is large, the edges of the cell are not equidistant from the base station, and there are many obstructions in the cell, then a large pilot is needed to reach the mobile terminals in the cell. In this case, a pilot-fraction blocking threshold close to, or appreciably larger than, the full load pilot fraction should be selected. The third factor is the aggressiveness of the overload control, which is the balance between the desire to increase the capacity of the system and the desire to ensure the signal is received at a particular quality. When the pilot-fraction blocking threshold is significantly less than the full load pilot fraction the capacity of the system is higher because call blocking is initiated when there are more traffic signals in the cell, which typically means that there are more mobile terminals in the cell. However, due to there being more traffic signals in the cell, it is more difficult for the mobile terminals at the edge of the cell to obtain the pilot clearly and continuously. For example, using the above factors, for a base stations having a 0.15 full load pilot fraction, with small cell size and little interference due to the cells terrain, and with aggressive overload control, the pilot-fraction blocking threshold can be selected to be 0.1. In addition to these factors, other factors that affect how well a base station's pilot is received at the mobile terminals can also be used in determining the pilot-fraction blocking threshold.

After comparator 220 compares the current frame's average pilot fraction with the pilot-fraction blocking threshold, it indicates to controller 240 whether the current frame's pilot fraction is below the pilot-fraction blocking threshold. When the current frame's pilot fraction is below the pilot-fraction blocking threshold call blocking should be initiated, and controller 240 then notifies the call admission controller that call blocking should be initiated.

The call admission controller initiates call blocking. The call admission controller is typically a call admission program that determines whether a call from a particular mobile terminal is to be initiated in the system. The first step in this determination is typically to check whether the base station can accept another call, which involves checking whether call blocking is on. The next step in the determination is to check whether the mobile terminal requesting to place the call is one that is allowed to use the wireless system, which involves authenticating the mobile terminal. The call admission program is typically located in MSC 20 although it can be located in base station 200, or distributed between MSC 20 and base station 200.

The call admission program can initiate call blocking at the start of the frame subsequent to the one in which the notification is received. Alternatively, the call admission program can initiate call blocking as soon as the notification is received. When the circuitry and/or software involved are fast enough the call admission program can initiate call blocking during the frame for which the current frame ratio is obtained.

Figure 4:
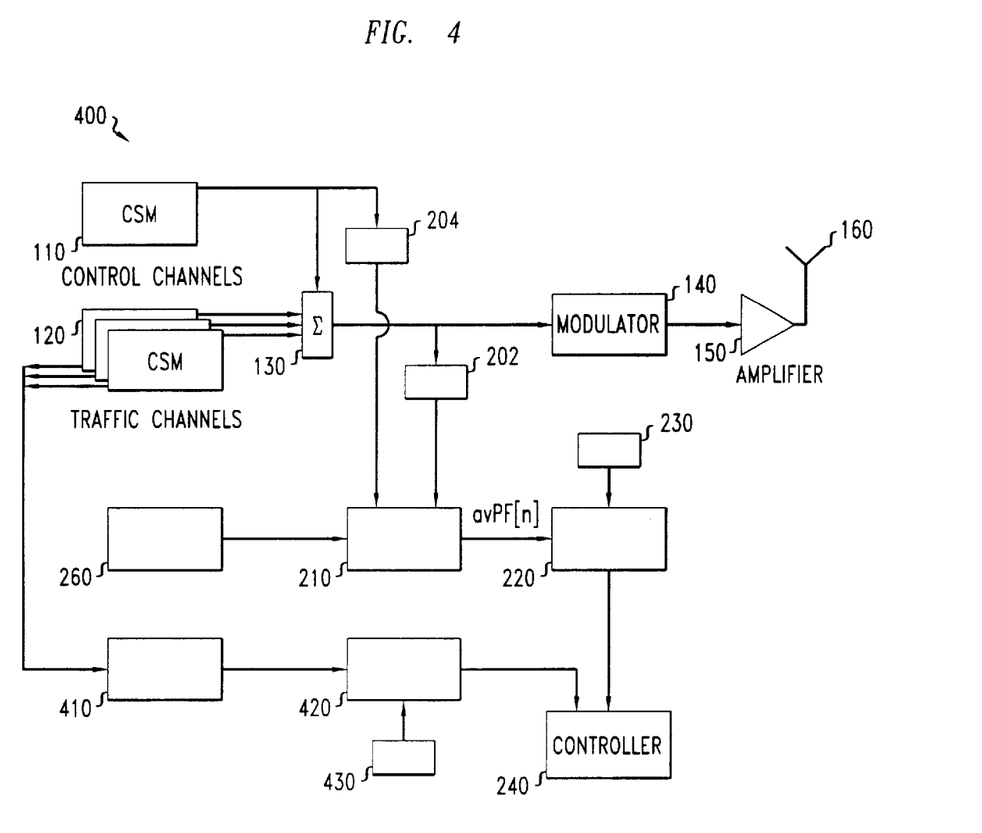
FIG. 4 is a block diagram of a portion of a base station where call blocking is initiated responsive to a pilot fraction being below pilot-fraction blocking threshold, and responsive to a frame error rate being above a frame-error-rate blocking threshold.

Other call-quality measurements can be used, alone or combination, instead of or in addition to the pilot fraction of the forward link to determine whether call blocking should be initiated. For example, as shown in FIG. 4, the forward link's frame error rate can be used in addition to the pilot ratio to determine whether call blocking should be initiated. A frame error occurs when one or more uncorrectable bit errors occur in a frame. The frame error rate is the number of frame errors divided by the total number of frames observed. Determining whether call blocking should be initiated using the frame error rate can be performed in a similar manner as described above for determining whether call blocking should be initiated using the average pilot fraction.

Each traffic-channel channel element 120 determines the frame error rate of its forward-link traffic signal for the current frame. Typically, the mobile terminal notifies the base station when an error is received on the forward-link traffic signal and this information is passed to the forward-link traffic signal's channel element 120. The individual-traffic-signal frame error rate for the current frame is the number of frame errors observed starting at a particular frame and continuing until the current frame, divided by the total number of frames observed during this time. The individual-traffic-signal frame error rates for the current frame are passed to second averaging element 410. Second averaging element 410 averages the individual-traffic-signal frame error rates for the current frame to obtain the combined frame error rate for the current frame, referred to herein as FER[n].

Second averaging element 410 then determines the current frame's average frame error rate avFER[n] using a single pole infinite impulse response (IIR) filter. Second averaging element 410 operates similarly to first averaging element 410. Second averaging element 410 uses the combined frame error rate for the current frame FER[n] scaled by $\lambda$, and the previous frame's average frame error rate avFER[n−1] scaled by an adjustment factor based on $\lambda$, as shown in equation 2.

$$avFER[n] = \frac{1}{\lambda} * FER[n] + \left(1 - \frac{1}{\lambda}\right) * avFER[n-1] \qquad (2)$$

Second averaging element 410 provides the current frame's average frame error rate avFER[n] to comparator 420. Comparator 420 compares the average frame error rate avFER[n] with a frame-error-rate (FER) blocking threshold, which can be stored in memory 430. The FER blocking threshold is preferably between 80% to 300% of the desired frame error rate, which is typically 1%, although it can be any value between 60% and 1000% of the desired frame error rate. The FER blocking threshold is based on the desired frame error rate and the aggressiveness of the overload control, which is the balance between the desire to increase the capacity of the system and the desire to ensure the signal is received at a particular quality. When the FER blocking threshold is significantly larger than the frame error rate the capacity of the system is higher because call blocking is initiated when there are more erred frames. However, due to there being more erred frames the quality of the signal is reduced. In addition to these factors, other factors that affect the frame error rate can also be used in determining the FER blocking threshold.

After comparator 420 compares the current frame's average frame error rate with the FER blocking threshold, it indicates to controller 240 whether the current frame's frame error rate is above the FER blocking threshold.

Controller 240 then checks the results of both comparators 220 and 420. When the current frame's pilot fraction is below the pilot-fraction blocking threshold, or when the current frame's frame error rate is above the FER blocking threshold, call blocking should be initiated. In this case, controller 240 notifies the call admission program that call blocking should be initiated. Alternatively, controller 240 can notify the call admission program that call blocking should be initiated when both comparators 220 and 420 indicate that call blocking should be initiated.

Alternatively, the frame error rate of the individual forward-link traffic signals can be used to determine whether call blocking should be initiated. As described above, each traffic-channel channel element 120 determines the frame error rate of its forward-link traffic signal for the current frame. The frame error rate of the individual traffic signals can be compared with the FER blocking threshold in a comparator. Call blocking can be initiated when a predetermined number, such as 10%, of these frame error rates are below the FER blocking threshold.

The method for initiating call blocking can be used with other methods of overload control. For example, the method for initiating call blocking can be used with the overload power control method disclosed in U.S. patent application "Aggregate Overload Power Control", Ser. No. 08/356,816, incorporated herein by this reference. This overload power control method changes the power level of a set of forward-link signals responsive to a threshold power level that is based on the amplifier's maximum continuous power level, independent of the individual power control of each of the forward-link signals in the signal set. The power level of the signal set is changed by scaling it by a scaling factor. The total power level of the signal set is obtained during a current time period, and then the scaling factor that will be used in the subsequent time period is determined. The scaling factor is preferably based on the total power level of the signal set for the current time period, a scaling factor used during the current time period, and a threshold power level. The amount by which the total power level exceeds the amplifier's maximum continuous power level is the overload amount. The scaling factor is selected so that for each time period the overload amount is reduced by a percentage or a fixed factor. For example, the overload amount can be reduced by 3% for the current time period, then the percentage may be changed for a subsequent time period based on the scaling factor of the current time period and the overload amount of the subsequent interval. In such a case the power levels of the scaled combined-baseband signal and the scaled pilot are measured and input into first averaging element.

The foregoing is merely illustrative. Thus, for example although in the illustrative embodiment the time period is one frame, any time period can be used during which a power level measurement of signals on the forward link can be taken. For example, the time period can be several frames, or one or several power control groups, which are time periods having a length of $\frac{1}{16}$ of a frame.

Furthermore, although in the illustrative embodiment the power level of all of the signals corresponding to a sector of the base station are combined to obtain the total power level, in alternative embodiments only some of the signals corresponding to a sector of the base station can be combined to obtain the total power level of the set of signals in the sector.

Still further, although in the illustrative embodiment the method is implemented in hardware, it can be implemented in software.

Moreover, although in the illustrative embodiment the channel elements are shown in parallel, with the resulting signals combined in one combiner, the channel elements can be signal set up in series. In this case, the signal from each channel element is combined with signals from the previous channel elements in the series.

Additionally, one skilled in the art will recognize that although in the illustrative embodiment each cell is an omni sector cell, the cell can be divided into a plurality of sectors, with each sector having its own channel elements, radios, which include a modulator and an amplifier, and antennas. In this case, the pilot's power measurement and the combined-baseband signal's power measurement are taken on a per-sector basis and input into the first averaging element. The average frame error rate is also obtained on a per sector basis. The resulting average pilot fraction and average frame error rate are then used to determine if call blocking should be initiated in the sector. Each sector can have its own first and second averaging element, or, alternatively, one first and/or second averaging element can be used for all the sectors.

Moreover, in the illustrative embodiment the average pilot fraction for the current time period and the average frame error rate are determined using an IIR filter. In an alternative embodiment a finite impulse response (FIR) filter can be used to determine either or both of these values. For the average pilot fraction, the FIR filter uses the pilot fraction for the current time period, and the pilot fractions of a plurality of frames, averaged over a plurality of frames. For the average frame error rate, the FIR filter uses the combined frame error rate for the current time period, and the average frame error rates of a plurality of frames, averaged over a plurality of frames.

Additionally, although in the illustrative embodiment the wireless communication system is a CDMA 2000 system, this should not be construed to limit the present invention to base stations and mobile stations employing CDMA 2000 techniques. The present invention may equally be applicable to base stations and mobile stations employing other CDMA techniques and other multiple access techniques, such as Time Division Multiple Access ("TDMA"), and Global System for Mobile (GSM).

While the invention has been described with reference to a preferred embodiment, it will be understood by those skilled in the art having reference to the specification and drawings that various modifications and alternatives are possible therein without departing from the spirit and scope of the invention.

We claim:

1. A method for use in a wireless system that includes at least one base station, the base station generating a set of signals for forward link communication channels, the method comprising the step of initiating call blocking responsive to at least a relationship between a pilot fraction and a pilot-fraction blocking threshold, the pilot fraction being a ratio of a power level of a pilot within the base station to a power level of the set of signals within the base station.

2. The method of claim 1, wherein the set of signals comprises all the signals in a sector of a cell in which the base station is located.

3. The method of claim 1, wherein the set of signals comprises a plurality of traffic signals.

4. The method of claim 1, wherein the initiating step comprises initiating call blocking further responsive to a frame error rate of the signals in the set of signals.

5. The method of claim 1, wherein the initiating step comprises:
   obtaining the power level of the set of signals for a current time period;
   obtaining the power level of the pilot for the current time period;
   determining the pilot fraction for the current time period;
and wherein the relationship is that the pilot fraction is lower than the pilot-fraction blocking threshold.

6. The method of claim 1, wherein the initiating step comprises:
   obtaining the power level of the set of signals for a current time period;
   obtaining the power level of the pilot for the current time period;
   determining an average pilot fraction for the current time period;
and wherein the relationship is that the average pilot fraction is lower than the pilot-fraction blocking threshold.

7. The method of claim 6, wherein average pilot fraction for the current time period is based on the pilot fraction for the current time period, and an average pilot fraction for a previous time period.

8. The method of claim 1, wherein the pilot-fraction blocking threshold is based on a plurality of factors, the plurality of factors comprising:
   a ratio of the pilot's power level to the signal set's power level at full load; and
   terrain, size, and shape of a cell in which the base station is located.

9. The method of claim 1, wherein the pilot-fraction blocking threshold comprises any value between about 60% and 120% of a ratio of the pilot's power level to the signal set's power level at full load.

10. The method of claim 5, wherein the base station comprises a plurality of pilot's, each corresponding to one sector of a cell in which the base station in located, the base station further comprising a plurality of sets of signals, each signal set having signals corresponding to one sector of a cell in which the base station is located, and wherein:
   the step of obtaining the power level of the set of signals for the current time period comprises obtaining a power level for each set of signals for the time period;
   the step of obtaining the power level of the pilot for the current time period comprises obtaining a power level for each pilot for the time period;
   the determining step comprises determining the pilot fraction for each sector; and
   the initiating step comprises initiating call blocking of each sector responsive to the relationship between the pilot fraction associated with that sector and the pilot-fraction blocking threshold.

11. The method of claim 5, wherein the time period comprises a frame.

12. The method of claim 5, wherein the time period comprises a power control group.

13. The method of claim 1, the initiating step comprises initiating call blocking further responsive to an average frame error rate of the signals in the set of signals.

14. The method of claim 13, wherein the initiating step further comprises:
   obtaining a combined frame error rate of the set of signals for a current time period, the combined frame error rate being the average of the frame error rates of the signals in the set of signals;
   obtaining an average frame error rate for the current time period; and
   initiating call blocking further responsive to the average frame error rate being larger than a frame-error-rate blocking threshold.

15. The method of claim 4, wherein the initiating step further comprises:
   obtaining a combined frame error rate of the set of signals for a current time period, the combined frame error rate being the average of the frame error rates of the signals in the set of signals; and
   initiating call blocking further responsive to the combined frame error rate being larger than a frame-error-rate blocking threshold.

16. The method of claim 5, wherein the obtaining steps are performed in the base station.

17. The method of claim 6, wherein the obtaining steps are performed in the base station.

18. A method for use in a wireless system that includes at least one base station, the base station generating a set of signals for forward link communication channels, the method comprising the steps of:
   obtaining a power level of the set of signals for a current time period;
   obtaining a power level of the pilot for the current time period, the average pilot fraction for the current time period being a ratio of the pilot's power level to the signal set's power level for the current time period and an average pilot fraction for a previous time period;
   determining an average pilot fraction for the current time period; and
   initiating call blocking responsive to the average pilot fraction being lower than a pilot-fraction blocking threshold;
   the obtaining steps being performed within the base station.

19. The method of claim 18, wherein the pilot-fraction blocking threshold is based on a plurality of factors, the plurality of factors comprising:
   a ratio of the pilot's power level to the signal set's power level at full load; and
   terrain, size, and shape of a cell in which the base station is located.

20. The method of claim 18, wherein the pilot-fraction blocking threshold comprises any value between about 60% and 120% of the ratio of the pilot's power level to the signal set's power level at full load.

21. The method of claim 18, wherein the base station comprises a plurality of pilot's, each corresponding to one sector of a cell in which the base station in located, the base station further comprising a plurality of sets of signals, each signal set having signals corresponding to one sector of a cell in which the base station is located, and wherein:

the step of obtaining the power level of the set of signals for the current time period comprises obtaining a power level for each set of signals for the time period;

the step of obtaining the power level of the pilot for the current time period comprises obtaining a power level for each pilot for the time period;

the determining step comprises determining an average pilot fraction for each sector; and the initiating step comprises initiating call blocking of each sector responsive to the average pilot fraction associated with that sector.

22. The method of claim 18, wherein the time period comprises a frame.

23. The method of claim 18, wherein the time period comprises a power control group.

24. The method of claim 18, wherein the set of signals comprises all the signals in a sector of a cell in which the base station is located.

25. The method of claim 17, wherein the initiating step comprises initiating call blocking further responsive to an average frame error rate for the current frame being larger than a frame-error-rate blocking threshold.

26. The method of claim 17, wherein the initiating step comprises initiating call blocking further responsive to a frame error rate for the current frame being larger than a frame-error-rate blocking threshold.

27. A method for use in a wireless system that includes at least one base station, the base station generating a set of signals for forward link communication channels, the method comprising the step of initiating call blocking as a function of solely a relationship between a pilot fraction and a pilot-fraction blocking threshold, the pilot fraction being the ratio of the power level of the pilot to the power level of the set of signals.

28. A method for use in a wireless system that includes at least one base station, the method comprising the step of initiating call blocking based on the number of calls dropped by the base station.

29. A method for use in a wireless system that includes at least one base station, the base station generating a set of signals for forward link communication channels, the method comprising the step of initiating call blocking responsive to at least a relationship between a pilot fraction and a pilot-fraction blocking threshold, the pilot fraction being a ratio of a power level of a pilot to a power level of the set of signals.

* * * * *

UNITED STATES PATENT AND TRADEMARK OFFICE
CERTIFICATE OF CORRECTION

PATENT NO.    : 6,487,415 B1
DATED         : November 26, 2002
INVENTOR(S)   : Edward Ellis Eibling et al.

It is certified that error appears in the above-identified patent and that said Letters Patent is hereby corrected as shown below:

<u>Tilte page,</u>
Item [75], Inventor's name, should read -- Asif Dawoodi Ganhi --

Signed and Sealed this

Twenty-fifth Day of March, 2003

JAMES E. ROGAN
*Director of the United States Patent and Trademark Office*